United States Patent
Heinken et al.

(10) Patent No.: US 11,041,777 B2
(45) Date of Patent: Jun. 22, 2021

(54) METHOD FOR CHECKING THE PLAUSIBILITY OF A PRESSURE SENSOR

(71) Applicant: VOLKSWAGEN AKTIENGESELLSCHAFT, Wolfsburg (DE)

(72) Inventors: Sebastian Heinken, Braunschweig (DE); Christoph Nee, Wolfsburg (DE)

(73) Assignee: VOLKSWAGEN AKTIENGESELLCHAFT, Wolfsburg (DE)

(*) Notice: Subject to any disclaimer, the term of this patent is extended or adjusted under 35 U.S.C. 154(b) by 0 days.

(21) Appl. No.: 16/562,823

(22) Filed: Sep. 6, 2019

(65) Prior Publication Data

US 2020/0080909 A1   Mar. 12, 2020

(30) Foreign Application Priority Data

Sep. 7, 2018   (DE) ............... 10 2018 215 195.4

(51) Int. Cl.
| | |
|---|---|
| *G01L 27/00* | (2006.01) |
| *G01M 15/10* | (2006.01) |
| *F01N 9/00* | (2006.01) |
| *B01D 46/00* | (2006.01) |

(52) U.S. Cl.
CPC ........ *G01L 27/007* (2013.01); *B01D 46/0086* (2013.01); *F01N 9/00* (2013.01);
(Continued)

(58) Field of Classification Search
CPC ............ B01D 46/0086; B01D 2279/30; F01N 11/002; F01N 11/005; F01N 9/00;
(Continued)

(56) References Cited

U.S. PATENT DOCUMENTS

| | | |
|---|---|---|
| 2009/0222231 A1 | 9/2009 | Berger et al. |
| 2010/0218489 A1 | 9/2010 | Harndorf et al. |

(Continued)

FOREIGN PATENT DOCUMENTS

| | | |
|---|---|---|
| CN | 101548079 A | 9/2009 |
| CN | 102787895 A | 11/2012 |

(Continued)

OTHER PUBLICATIONS

Machine Translation of JP2005307880 A (Year: 2005).*
(Continued)

*Primary Examiner* — Brandon D Lee
(74) *Attorney, Agent, or Firm* — Pearl Cohen Zedek Latzer Baratz LLP

(57) ABSTRACT

A method for checking the plausibility of a pressure sensor that, during the measurement of a differential pressure, records measured values, whereby the measured values from the pressure sensor are compared to reference values for the differential pressure calculated on the basis of a model; whereby in order to determine the plausibility, at least one deviation of the measured values from the reference values and a difference between a first slope of the changing measured values and a second slope of the changing reference values over the curve of the measured values are taken into account.

16 Claims, 2 Drawing Sheets

(52) U.S. Cl.
CPC ....... *G01M 15/106* (2013.01); *B01D 2279/30* (2013.01); *F01N 2900/1606* (2013.01)

(58) Field of Classification Search
CPC ......... F01N 2560/08; F01N 2900/1406; F01N 2900/1606; F02B 77/08; G01L 27/00; G01L 27/007; G01M 15/04; G01M 15/106; Y02T 10/40
See application file for complete search history.

(56) References Cited

U.S. PATENT DOCUMENTS

| | | |
|---|---|---|
| 2012/0291629 A1 | 11/2012 | Tylutki et al. |
| 2018/0087432 A1 | 3/2018 | Odendall |
| 2018/0149543 A1 | 5/2018 | Klesse et al. |

FOREIGN PATENT DOCUMENTS

| | | |
|---|---|---|
| CN | 105089758 A | 11/2015 |
| CN | 105089761 A | 11/2015 |
| CN | 107882618 A | 4/2018 |
| DE | 10 2005 025 884 A1 | 12/2006 |
| DE | 10 2012 203 283 A1 | 9/2013 |
| DE | 10 2013 200 570 A1 | 7/2014 |
| DE | 10 2013 021 925 B3 | 5/2015 |
| DE | 10 2014 209 718 A1 | 11/2015 |
| DE | 10 2015 214 589 A1 | 2/2017 |
| DE | 10 2016 225 356 A1 | 6/2018 |
| JP | 2005-307 880 A | 11/2005 |
| JP | 2005-307880 A | 11/2005 |
| JP | 2005307880 A * | 11/2005 |
| KR | 10 2015 0 070 679 A | 6/2015 |

OTHER PUBLICATIONS

Search report for German Patent Application No. 10 2018 215 195.4, dated Apr. 17, 2019.

Office Action for Chinese Patent Application No. 201910843157.3, dated Dec. 1, 2020.

* cited by examiner

METHOD FOR CHECKING THE PLAUSIBILITY OF A PRESSURE SENSOR

CROSS REFERENCE TO RELATED APPLICATION

This application claims priority from German Patent Application No. 10 2018 215 195.4, filed Sept. 7, 2018, which is incorporated herein by reference in its entirety.

Field of the Invention

The invention relates to a method for checking the plausibility of a pressure sensor.

Background of the Invention

The aim of the method is to ascertain whether the pressure values measured with the pressure sensor are plausible. The pressure sensor is especially provided in an exhaust gas treatment unit (a catalytic converter, a storage element for storing or temporarily storing a component, a particulate filter, etc.) in order to determine a differential pressure that is present in the exhaust gas treatment unit.

Pressure sensors that are used, for example, in exhaust gas lines for monitoring particulate filters can be subject to temperature-dependent malfunctions. These malfunctions can be caused, for example, by freezing condensation water as a result of which the feed lines of the pressure sensor can be blocked at least partially or else completely and/or the function of a membrane of the pressure sensor can be impaired. In particular, in the case of a cold start of an internal combustion engine and/or in the case of driving operation at a low load, the pressure sensor can deliver incorrect and thus implausible measured values before the engine has heated up completely. Once the engine has heated up completely, the pressure sensor can be fully functional once again.

In particular, these malfunctions do not entail any irreversible damage to the pressure sensor and they can be caused by physical or measurement-related effects.

In this context, it is important to recognize these malfunctions and to distinguish them from actual sensor defects. It is also important to recognize that a malfunction of the pressure sensor has occurred so that the measured values can be recognized as not being plausible. In this manner, if the measured values that are used for a wide array of applications in a motor vehicle (e.g. controlling the internal combustion engine, carrying out regeneration procedures of the particulate filter, that is to say, detecting the load, diagnosing the turbocharger, regulating the charge pressure, detecting the filling level, etc.) are recognized as not being plausible, they can then be disregarded for these applications. Only after the plausibility has been recognized can the measured values be accepted for further use in other applications.

German patent application DE 10 2012 203 283 A1 discloses a method for checking the plausibility of a signal from a pressure sensor. The pressure sensor is associated with an injection device for an internal combustion engine, whereby the injection device can be relieved via a relief valve. Here, the procedure involves waiting until the relief valve has opened, and this occurs after the internal combustion engine has been switched off as a result of the fuel in the injection device having warmed up. In this context, the highest pressure value measured is matched with the known opening pressure of the relief valve.

German patent application DE 10 2013 200 570 A1 discloses another method for checking the plausibility of a system pressure determination. Here, within the scope of a pressure measurement, a discontinuity of a volume-pressure characteristic curve is compared to an expected discontinuity.

The objective of the present invention is to at least partially solve the problems encountered in the state of the art. In particular, a method is to be proposed by means of which the plausibility of measured values of a pressure sensor can be checked. In particular, the method is aimed at determining the nature of the malfunction of a pressure sensor.

SUMMARY OF THE INVENTION

A method having the features according to the independent claims contributes to achieving these objectives. Advantageous refinements are the subject matter of the dependent patent claims. The features put forward individually in the patent claims can be combined with each other in a technologically meaningful manner and can be augmented with explanatory facts from the description and/or with details from the figures, whereby additional variants of embodiments of the invention are elaborated upon.

A method for checking the plausibility of a pressure sensor is being put forward. During the measurement, the pressure sensor records measured values of a differential pressure. The measured values from the pressure sensor are compared to reference values for the differential pressure calculated on the basis of a model. In order to determine the plausibility, at least an deviation of the measured values from the reference values (i.e. measured value−reference value=deviation) and a difference between a first slope of the changing measured values (over time [second]) and a second slope (i.e. f'(measured value)−f'(deviation)=difference) of the changing reference values (over time) over the curve of the measured values are taken into account.

In particular, the pressure sensor is connected to a first measuring point via a first line and to a second measuring point via a second line. For example, the first measuring point is located in an exhaust gas line upstream from an exhaust gas treatment unit and the second measuring point is arranged downstream from one exhaust gas treatment unit or from the same exhaust gas treatment unit. For example, the pressure sensor has a membrane that evaluates, as the differential pressure, a pressure difference between a first pressure in the first line and a second pressure in the second line.

In particular, an exhaust gas treatment unit, preferably a particulate filter, is monitored during the measurement of the differential pressure. In particular, an increasing clogging of the particulate filter by soot should be detected in this process.

It is a known phenomenon that the function of such pressure sensors is impaired, for example, due to ice formation. In this context, due to the numerous possibilities of ice formation (for example, icing in the area of the first line and/or second line, icing of the membrane, etc.), the resultant change in the measured values cannot be precisely predicted.

Therefore, in particular, it is also not predictable to what extent a change in the measured values (especially a deviation from the reference values) is due to icing or due to some other problem.

In particular, a method is being proposed here that makes it possible to continuously check the plausibility of a pressure sensor, that is to say, to check whether the measured values reflect the differential pressure that is actually present. In this context, a comparison is made of the measured values to the reference values that are prescribed by a model. This comparison can be a correlation method or an estimation method with which a plausibility criterion is formed. This criterion especially provides information as to whether the measured value is useable or not. Particularly in the case of a correlation, a coefficient of reliability is obtained that—for example, if the value falls below a given threshold—recognizes an implausible measured value or a malfunction of the pressure sensor. In the method, the estimation can yield an expected value for a sensor offset, that is to say, the difference between measured values and reference values, which should normally be zero (0) hpa [hectopascal]. In case of a (temporary) malfunction, this sensor offset deviates considerably from the above-mentioned malfunction-free value of 0 hpa and is thus greater than or smaller than 0.

If an implausibility has been recognized, the pressure sensor is declared to be qualitatively unusable so that other applications that normally process the measured value can continue to operate, except now without taking into account the erroneous measured value.

In particular, the model is stored in a control unit and can be determined, for example, on a test bench by running through certain operating points. The model yields reference values for the differential pressure that are to be expected at certain operating points of the internal combustion engine or of the motor vehicle. During the operation of the motor vehicle, the reference values are determined, for instance, mathematically, on the basis of the actual operating point and correlated with the measured values, especially over time.

The proposed method is particularly aimed at providing the possibility to distinguish whether the pressure sensor and the model (in other words, the measured values of the pressure sensor and the reference values from the model) differ from each other on the basis of, for example, soot loading (part of the correct operation of the pressure sensor) or whether there are indeed impairments or even blockages caused by ice or other media. In this manner, particularly changing contact resistances can also be left out.

This significantly enhances the possible use of the measured values from the pressure sensor for other applications or for subsequent method functions (e.g. detecting the load of the particulate filter, diagnosing the particulate filter or the turbocharger, method functions such as regulating the charge pressure and detecting the filling level of an internal combustion engine), whereby moreover, unwarranted error storage entries for defective pressure sensors as well as erroneously identified need to initiate a regeneration of the particulate filter (to burn off soot) can be avoided.

In this context, it is especially being proposed for the measured values and the reference values to be compared continuously over time. In particular, the measured values and the reference values are not compared to each other here exclusively in absolute terms but rather by correlating and/or estimating information about the slope and the offset.

In particular, the deviation and/or the difference is/are used as a numerical value (that is to say, independent of the mathematical sign of the deviation and/or difference).

Preferably, a correlation factor is determined for the deviation and for the difference by means of a cross-correlation, whereby, if the value falls below a limit value for the correlation factor, an implausible measured value is assumed to be present.

In particular, a cross-correlation of parameters is a generally known mathematical method for comparing two different parameters or two different physical quantities (actual pressure or change in the pressure over time on the basis of the measured values or of their course over time and on the basis of the reference values or of their course over time) or else for determining a correlation between these parameters.

In particular, the parameters are weighted very differently here, that is to say, especially to the effect that an occurring deviation is more heavily weighted than a difference.

In particular, the deviation in the cross-correlation makes up at least 70% of the weighting and the difference makes up 30% at the most.

In particular, the cross-correlation takes into account the deviations and differences determined within a preceding time interval. The time interval is, for example, ten (10) minutes at the maximum, especially five (5) minutes at the maximum, preferably one (1) minute at the maximum.

In particular, the time interval is at least one (1) second, preferably at least five (5) seconds.

Preferably, the measured values and reference values for the deviation and for the difference that lie further back in time are taken into account with an ever-decreasing weighting as a function of the time interval.

In particular, the measured values from the pressure sensor are only taken into account for other applications (method functions, for example, detecting of the load of the particulate filter, diagnosing the particulate filter or the turbocharger, method functions such as regulating the charge pressure and detecting the filling level of an internal combustion engine) if the plausibility has been recognized.

In particular, the differential pressure that is present in an exhaust gas treatment unit is determined by the pressure sensor.

A motor vehicle is being proposed that has at least an internal combustion engine, an exhaust gas line for discharging the exhaust gas from the internal combustion engine, and an exhaust gas treatment unit that is arranged in the exhaust gas line and that has a pressure sensor for determining a differential pressure that is present in the exhaust gas treatment unit. In addition, a control unit is provided, which is configured so as to be suitable for carrying out the described method or which carries out or can carry out the method.

In particular, the exhaust gas treatment unit is a particulate filter.

Moreover, the method can also be carried out by a computer or with a processor of a control unit.

Accordingly, a data processing system is also being proposed that comprises a processor that is customized or configured to carry out the method or some of the steps of the proposed method.

A computer-readable storage medium can be provided that comprises commands that, when executed by a computer or processor, cause it to carry out the method or at least some of the steps of the proposed method.

The elaborations pertaining to the method can especially be applied to the motor vehicle, to the system, to the storage medium or to the computer-implemented method and vice versa.

For the sake of clarity, it should be pointed out that the numerals used here (first, second, etc.) serve primarily (only) to distinguish between several similar objects, quantities or processes, that is to say, they especially do not necessarily prescribe any dependence and/or sequence of these objects, quantities or processes relative to each other. If a dependence and/or sequence should be necessary, this is stated explicitly or else this is obvious to the person skilled in the art when he/she studies the concretely described embodiment.

BRIEF DESCRIPTION OF THE DRAWINGS

The invention as well as the technical realm are explained in greater detail below on the basis of the accompanying figures. It should be pointed out that the invention should not be construed as being limited by the cited embodiments. In particular, unless explicitly indicated otherwise, it is also possible to extract partial aspects of the facts explained in the figures and to combine them with other elements and insights from the present description. In particular, it should be pointed out that the figures and especially the size ratios given are only exemplary.

The following is shown.

DETAILED DESCRIPTION OF THE INVENTION

Figure 1:
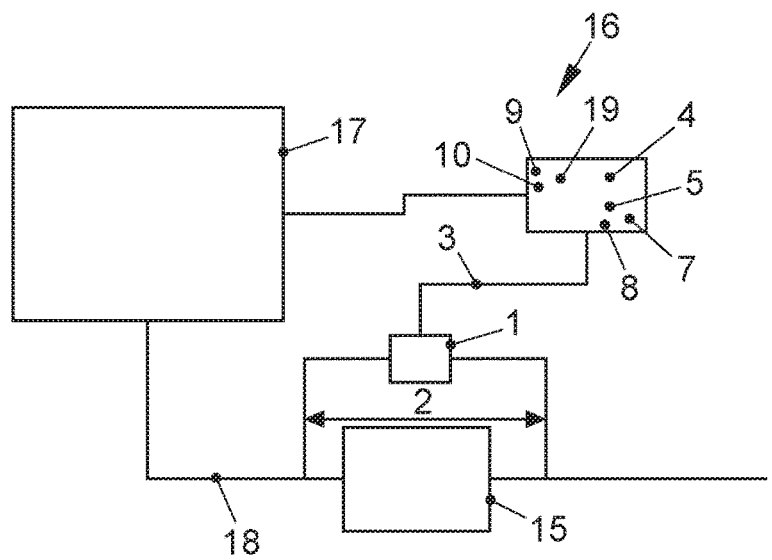
FIG. 1: a motor vehicle 2 with a drive train 1.

The motor vehicle 16 has an internal combustion engine 17, an exhaust gas line 18 for discharging exhaust gas from the internal combustion engine 17, and an exhaust gas treatment unit 15 that is arranged in the exhaust gas line 18 and that has a pressure sensor 1 for determining a differential pressure 2 that is present in the exhaust gas treatment unit 15. In addition, a control unit 19 is provided, which is configured so as to be suitable for carrying out the described method. In the control unit 19, a model 4 is stored by means of which reference values 5 for the differential pressure 2 can be determined mathematically (and theoretically) as a function of the operating point that is present.

Figure 2:
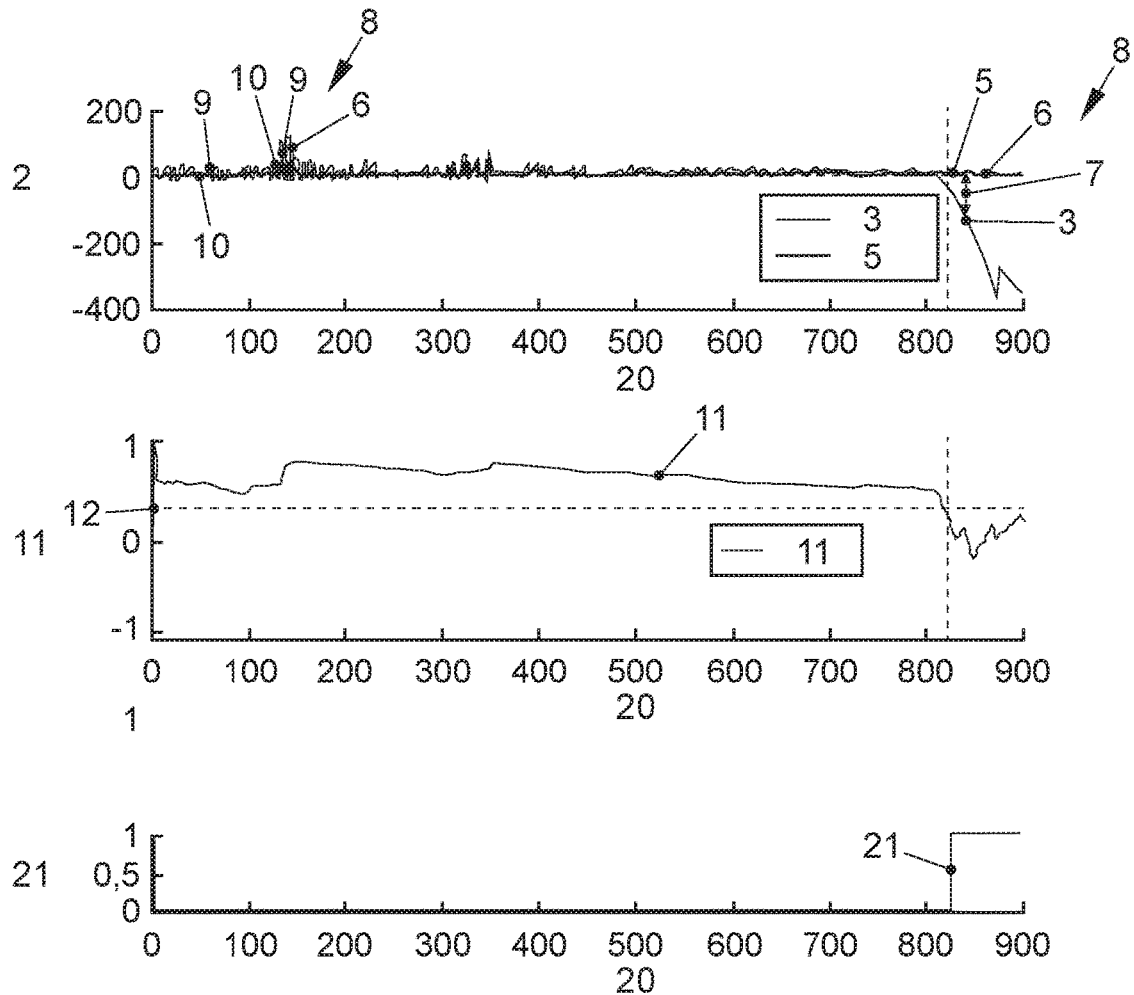
FIG. 2: first diagrams.

FIG. 2 shows first diagrams. In the uppermost diagram, the differential pressure 2 is plotted on the vertical axis. The time 20 is plotted on the horizontal axis. Furthermore, the curves 6 of the measured values 3 and of the reference values 5 are plotted over the time 20.

The curves 6 show that, on the one hand, at certain points in time, the first slope 9 of the curve 6 of the measured values 3 exceeds the second slope 10 of the curve 10 of the reference values 5 (e.g. between the values 0 and approx. 120 of the time 20). Beyond the value 800 of the time 20, the curve 6 of the measured values 3 diverges increasingly from the curve 6 of the reference values 5.

In the middle diagram, the correlation factor 2 (between −1 and 1) is plotted on the vertical axis. The time 20 is plotted on the horizontal axis. Furthermore, the curve of the correlation factor 11 is plotted over the time 20.

The correlation factor 11 is determined as a function of the correlation of the deviation 7 and the difference 8. It can be seen that the correlation factor 11 is already significantly lower at the occurring difference 8 between the values of 0 and approx. 120 of the time 20 due to the fluctuation of the curve 6 of the measured values 3. However, a limit value of 12 of the correlation factor 11 at which the state 21 would indicate icing of the pressure sensor 2 is not reached.

Due to the pronounced deviation 7 between the measured values 3 and the reference values 5 beyond the value 800 of the time 20 and due to the difference 8 of the slopes 9, 10 in this range, the correlation factor 11 here falls below the limit value 12, so that a state 21 of icing (see the lowermost diagram) is detected.

From this point onward, the measured values 3 are recognized as being implausible and are no longer used for other applications.

In the lower diagram, the state 21 is plotted on the vertical axis (zero=no icing; 1=icing detected). The time 20 is plotted on the horizontal axis. Furthermore, the curve of the state 21 identified on the basis of the curve of the correlation factor 11 is plotted over the time 20.

Figure 3:
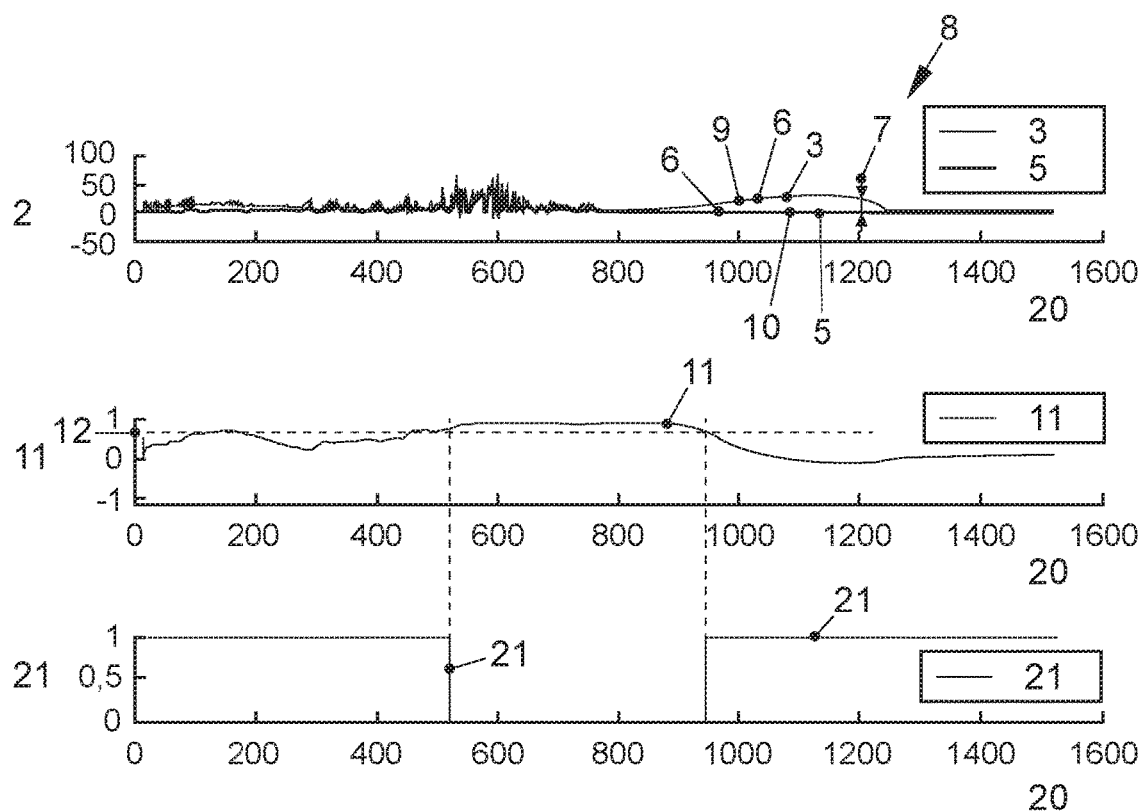
FIG. 3: second diagrams.

FIG. 3 shows second diagrams. In the uppermost diagram, the differential pressure 2 is plotted on the vertical axis. The time 20 is plotted on the horizontal axis. Furthermore, the curves 6 of the measured values 3 and of the reference values 5 are plotted over the time 20.

In the middle diagram, the correlation factor 2 (between −1 and 1) is plotted on the vertical axis. The time 20 is plotted on the horizontal axis. Furthermore, the curve of the correlation factor 11 is plotted over the time 20.

In the lowermost diagram, the state 21 is plotted on the vertical axis (zero=no icing; 1=icing detected). The time 20 is plotted on the horizontal axis. Furthermore, the curve of the state 21 identified by the curve of the correlation factor 11 is plotted over the time 20.

It can be seen here that the state 21 of icing is detected several times (between the values of zero and 500 and above the value of 950 of the time 20).

It should be noted that a different limit value of 12 has been determined here for the correlation factor 11.

LIST OF REFERENCE NUMERALS 1 pressure sensor
2 differential pressure
3 measured value
4 model
5 reference value
6 curve
7 deviation
8 difference
9 first slope
10 second slope
11 correlation factor
12 limit value
13 time interval
14 distance
15 exhaust gas treatment unit
16 motor vehicle
17 internal combustion engine
18 exhaust gas line
19 control unit
20 time
21 state

The invention claimed is:

1. A method for checking the plausibility of a pressure sensor of an engine or vehicle that, during the measurement of a differential pressure over a period of time, records measured values, comprising:
    determining reference values for expected differential pressure over the period of time based on:
        a model of reference values expected at certain operating points of the engine or the vehicle, and
        actual operating points of the engine or the vehicle over the period of time;
    calculating a correlation factor, by, for each of a plurality of times in a range of the period of time, comparing:
        a deviation of the measured value for the time to a reference value for the time, and
        a difference between a first slope of changes of the measured values in the range and a second slope of changes in the reference values in the range; and
    determining the plausibility of the pressure sensor, taking into account values of the correlation factor.

2. The method according to claim 1, wherein the at least one deviation or the difference is an absolute value.

3. The method according to claim 1, wherein:
calculating the correlation factor comprises, for each of the plurality of times within a first time interval of the period of time, calculating a cross-correlation between:
a deviation of the measured value for the time to a reference value for the time, and
a difference between a first slope of changes of the measured values in the first time interval and a second slope of changes in the reference values in the first time interval, and
if the calculated correlation factor falls below a limit value for the correlation factor, an implausible measured value is assumed to be present.

4. The method according to claim 3, wherein, for each of the plurality of times within the first time interval, the deviation is given a greater weight than the difference when calculating the cross-correlation.

5. The method according to claim 3, calculating the cross-correlations for the first time interval further takes into account deviations and a difference determined within at least a second time interval of the period of time preceding the first time interval.

6. The method according to claim 5, wherein, when calculating the cross-correlations for the first time interval:
the deviations and the differences for the first time interval are given a greater weight than the deviations and difference for the second time interval, and
if there is a time interval preceding the second time interval in the period of time, the deviations and the difference for the second time interval are given a greater weight than deviations and difference for the interval preceding the second time interval.

7. The method according to claim 1, whereby the measured values from the pressure sensor are only taken into account for other applications if the plausibility has been recognized.

8. The method according to claim 1, further comprising determining the differential pressure that is present in an exhaust gas treatment unit by the pressure sensor.

9. A motor vehicle, comprising:
an internal combustion engine,
an exhaust gas line for discharging the exhaust gas from the internal combustion engine,
an exhaust gas treatment unit that is arranged in the exhaust gas line and that has a pressure sensor for determining a differential pressure that is present in the exhaust gas treatment unit, and
a control unit that is configured for carrying out the method according to claim 1.

10. The motor vehicle according to claim 9, whereby the exhaust gas treatment unit is a particulate filter.

11. A motor vehicle, comprising:
an internal combustion engine,
an exhaust gas line for discharging the exhaust gas from the internal combustion engine,
an exhaust gas treatment unit that is arranged in the exhaust gas line and that has a pressure sensor for determining a differential pressure that is present in the exhaust gas treatment unit, and
a control unit that is configured:
determine reference values for expected differential pressure over a period of time based on:
a model of reference values expected at certain operating points of the internal combustion engine or the motor vehicle, and
actual operating points of the internal combustion engine or the motor vehicle over the period of time;
determine the plausibility of the pressure sensor by, for each of a plurality of times in a first time interval of the period of time, comparing:
a deviation of the measured value for the time to a reference value for the time, and
a difference between a first slope of changes of the measured values in the first interval and a second slope of changes in the reference values in the first interval.

12. The motor vehicle according to claim 11, wherein determining the plausibility of measured values includes:
the control unit calculating a correlation factor over the time interval by, for each of the plurality of times within the first time interval, calculating a cross-correlation between the deviation for the time and the difference for the first time interval; and
the control unit determining that the pressure sensor measured an implausible value if a value of the correlation factor falls below a predetermined limit value for the correlation factor.

13. The motor vehicle according to claim 12, wherein, for each of the plurality of times within the first time interval, the control unit is configured to give the deviation a greater weight than the difference when calculating the cross-correlation.

14. The motor vehicle according to claim 12, wherein the control unit is configured to, when calculating the cross-correlations for the first time interval, additionally take into account deviations and a difference determined within at least a second time interval preceding the first time interval, wherein the deviations and difference for each of the at least second time interval is given decreasing weight as a function of how much further back in time the preceding time interval is.

15. The motor vehicle according to claim 11, wherein, for other applications, the control unit is configured to only take into account the measured values from the pressure sensor if the control unit determines that the measured values are plausible.

16. The motor vehicle according to claim 11, wherein the exhaust gas treatment unit is a particulate filter.

* * * * *